(12) United States Patent
Wang

(10) Patent No.: US 10,165,041 B2
(45) Date of Patent: Dec. 25, 2018

(54) SYSTEM AND METHOD FOR UNINTERRUPTED LEARNING

(71) Applicant: Equalearning Corp., Capistrano Beach, CA (US)

(72) Inventor: Shih-Yuan Wang, Capistrano Beach, CA (US)

(73) Assignee: Equalearning Corp., Capistrano Beach, CA (US)

( * ) Notice: Subject to any disclaimer, the term of this patent is extended or adjusted under 35 U.S.C. 154(b) by 167 days.

(21) Appl. No.: 15/292,540

(22) Filed: Oct. 13, 2016

(65) Prior Publication Data

US 2018/0109591 A1    Apr. 19, 2018

(51) Int. Cl.
*H04L 29/08* (2006.01)
*H04L 29/06* (2006.01)
(Continued)

(52) U.S. Cl.
CPC .......... *H04L 67/06* (2013.01); *H04L 65/1069* (2013.01); *H04L 67/42* (2013.01); *H04W 4/80* (2018.02); *H04W 84/12* (2013.01)

(58) Field of Classification Search
CPC ..... H04L 65/4076; H04L 67/06; H04L 67/42; H04L 65/4015; H04L 63/10; H04L 67/2847; H04L 12/189; H04L 67/04; H04L 67/12; H04L 12/1831; H04L 12/1895; H04L 43/0811; H04L 67/14; H04L 67/22; H04L 67/36; H04W 4/008; H04W 4/80; H04W 72/085; H04W 76/10; H04W 76/11; H04W 76/16; H04W 76/18; H04W 76/19; H04W 76/20; H04W 76/23; H04W 76/25; H04W 76/27; H04W 76/28; H04W 76/30; H04W 76/36; H04W 88/00; H04W 88/005; H04W 88/08; H04W 88/085; H04W 88/10; H04W 88/12; H04W 88/16; H04W 92/10; H04W 92/12; H04W 92/14; G09B 7/00; G09B 5/00; G09B 7/02; G09B 5/02; G09B 5/12; G09B 7/07; G09B 5/125; G09B 17/00; G09B 19/06; G09B 5/06; G09B 5/062; G09B 5/065; G09B 5/14; G09B 7/04; G09B 7/06; G09B 7/077; G09B 7/08; A63F 13/213; A63F 13/235; A63F 13/31; A63F 13/327; A63F 13/352; A63F 13/355; A63F 13/46; A63F 13/537; A63F 13/5378; A63F 13/332; A63F 13/335; A63F 13/338; A63F 13/42; A63F 2300/6607; G06N 3/0445; G06N 3/08; G06N 3/084;
(Continued)

(56) References Cited

U.S. PATENT DOCUMENTS 8,027,671 B2 *  9/2011  Wallace, Jr. ...... G06F 17/30899
                                                    370/338
9,715,833 B2 *  7/2017  Jabara ..................... G09B 5/00
(Continued)

*Primary Examiner* — Greg C Bengzon
(74) *Attorney, Agent, or Firm* — Wang Law Firm, Inc.

(57) ABSTRACT

An adaptive server provides support for uninterrupted learning platform when connections to networks are unavailable or unstable. The adaptive server can communicate with a remote server through a local area network and switch to a cellular telecommunication network when the local area network is unavailable. The adaptive server can also act as a WiFi base station and accept connections from nearby student devices.

12 Claims, 10 Drawing Sheets

(51) Int. Cl.
*H04W 4/80* (2018.01)
*H04W 84/12* (2009.01)

(58) Field of Classification Search
CPC .... H04B 10/1149; H04B 10/116; H04B 1/38; H04B 7/18578
See application file for complete search history.

(56) References Cited

U.S. PATENT DOCUMENTS

| | | | | |
|---|---|---|---|---|
| 2011/0078325 A1* | 3/2011 | Vanover | ................ | H04L 63/10 709/232 |
| 2012/0054353 A1* | 3/2012 | Jung | ................ | H04W 88/04 709/227 |
| 2012/0202185 A1* | 8/2012 | Jabara | ................ | G09B 5/00 434/350 |
| 2012/0209906 A1* | 8/2012 | Ausfeld | ................ | H04L 12/1818 709/204 |
| 2012/0240197 A1* | 9/2012 | Tran | ................ | H04L 63/1416 726/4 |
| 2012/0311176 A1* | 12/2012 | Dellinger | ................ | H04L 69/18 709/232 |
| 2013/0238762 A1* | 9/2013 | Raleigh | ................ | H04L 67/306 709/219 |
| 2013/0332996 A1* | 12/2013 | Fiala | ................ | H04L 63/083 726/4 |
| 2014/0351880 A1* | 11/2014 | Low | ................ | H04L 63/20 726/1 |
| 2014/0359001 A1* | 12/2014 | Dupoteau | ................ | H04L 67/02 709/203 |
| 2014/0373123 A1* | 12/2014 | Kang | ................ | H04L 41/22 726/7 |
| 2015/0109897 A1* | 4/2015 | Lee | ................ | H04W 48/10 370/216 |
| 2015/0215832 A1* | 7/2015 | Fitzpatrick | ................ | H04W 48/18 455/426.1 |
| 2016/0007276 A1* | 1/2016 | Forssell | ................ | H04W 8/24 455/422.1 |
| 2016/0057253 A1* | 2/2016 | Zhou | ................ | H04W 84/12 709/203 |
| 2016/0219502 A1* | 7/2016 | Breton | ................ | H04W 48/18 |
| 2016/0226981 A1* | 8/2016 | McCann | ................ | H04L 67/146 |
| 2016/0278006 A1* | 9/2016 | Lee | ................ | H04W 76/10 |
| 2017/0164419 A1* | 6/2017 | Kim | ................ | H04W 76/028 |
| 2017/0171698 A1* | 6/2017 | Lan | ................ | H04W 4/80 |
| 2017/0223579 A1* | 8/2017 | Lee | ................ | H04W 76/18 |
| 2017/0265127 A1* | 9/2017 | Kim | ................ | H04W 48/18 |

* cited by examiner

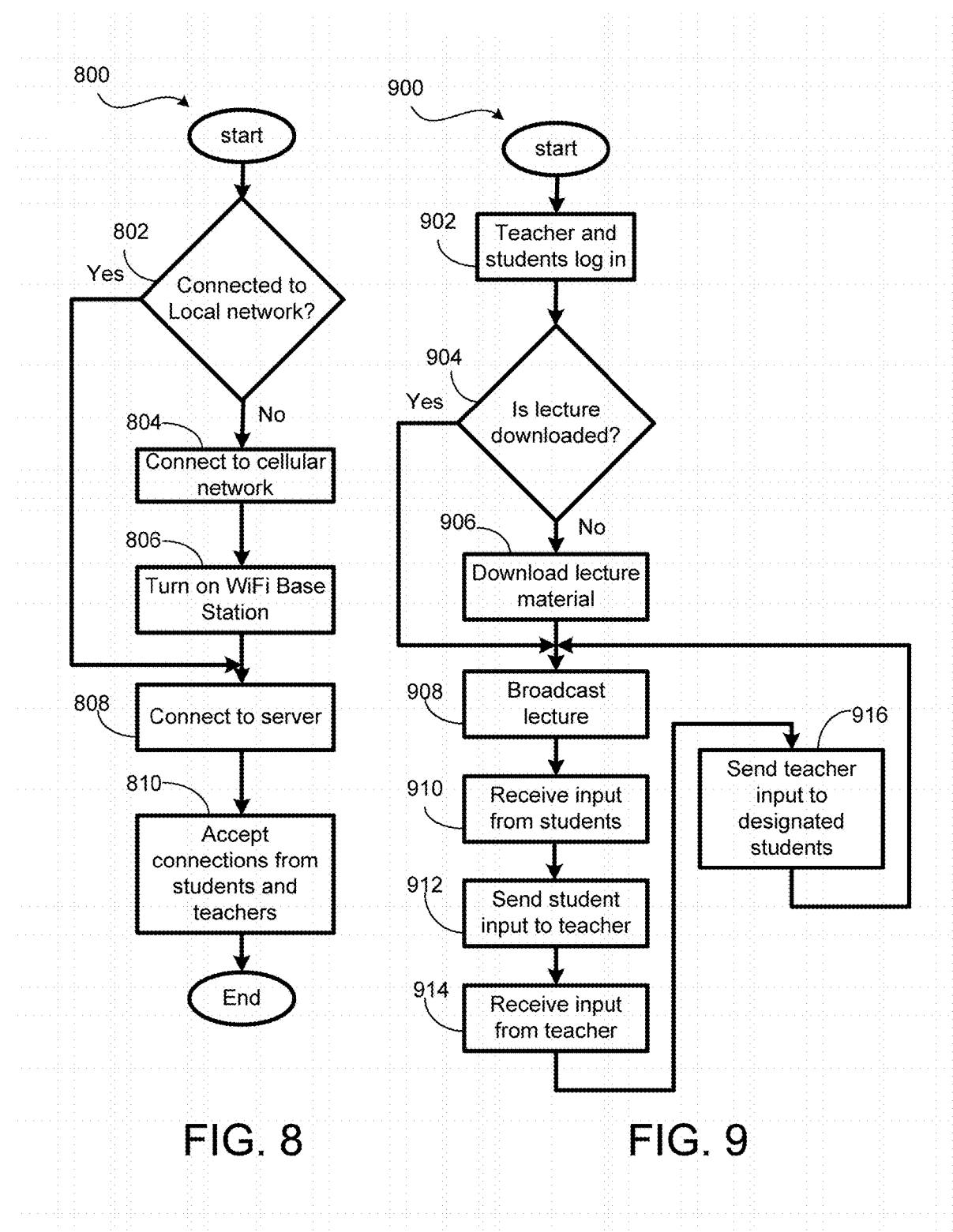

SYSTEM AND METHOD FOR UNINTERRUPTED LEARNING

FIELD OF THE INVENTION

The present invention generally relates to computer-based learning system, and more specifically to a system for network tolerant learning system.

BACKGROUND OF THE INVENTION

Most of computer-based learning systems currently available consist of portable computers loaded with learning material for students to use. The learning material may be downloaded from a remote server. The students use the learning material individually and independently. There is no interaction with teachers and the learning is not interactive.

Some computer-based learning systems allow the broadcasting of the learning material from the remote server onto the portable computers used by the students. Usually, these systems are also not interactive and are not available when the connection of the portable computers to the remote server is not available. FIG. 1 depicts a traditional computer-based learning system 100. The system 100 usually consists of a remote ser 102 that is accessible by student devices 114, 116, 118, which can be laptops, tablet computers, mobile phones, or other mobile device. The server 102 is also accessible to teacher using a laptop 106 or any other computing device connected to a network 120. Normally, a teacher prepares teaching material 104 on his or hers computer 106 and uploads the material 104 to the remote server 102. This teaching material 104 can be downloaded onto the student devices. The students can study the teaching material 104 individually and separately and can practice the tests that may be in the teaching material 104. The students provide their answers 108, 110, 112 on their student devices. If the tests are in format of multiple choices, the application running on the student devices generally checks the answers in real time and then sends the answers and the grading back to the remote server 102. If the tests are in format of essays and these essays are later uploaded onto the remote server 102. The teacher downloads the student answers from the remote server 102 and grades them. As it can be seen by the above description, the learning is not interactive and not in real time and the teacher has no opportunity to evaluate the student learning.

The aforementioned disadvantages prevent the computer-based learning systems from achieving the potential benefit that they may provide and it is to a system that enables the students to fully benefit from the computer-based learning system that the present application is primarily directed.

SUMMARY OF THE INVENTION

The present invention has been made to overcome the aforementioned disadvantages of conventional methods. The present invention provides a method for providing an uninterrupted teaching session. The method comprises determining, by a controller, a status of a connection to a remote server via a short range communication unit, connecting, by the controller, to the remote server via a long range communication unit if the connection to the remote server via the short range communication unit is unavailable, turning on, by the short range communication unit, a WiFi base station capability if both the connection to the remote server via the short range communication unit is unavailable and a connection to the remote server via the long range communication unit are unavailable, and communicating, via the WiFi base station capability, with at least one student device.

The present invention also provides a non-transitory computer readable memory have a set of computer-executable instructions, which, when executed by a controller in a computer, cause the computer to determine, by the controller, a status of a connection to a remote server via a short range communication unit in the computer, to connect, by the controller, to the remote server via a long range communication unit in the computer if the connection to the remote server via the short range communication unit is unavailable, to turn on, by the short range communication unit in the computer, a WiFi base station capability if both the connection to the remote server via the short range communication unit is unavailable and a connection to the remote server via the long range communication unit are unavailable, and to communicate, via the WiFi base station capability, with at least one student device.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein:

FIG. 8 is a flowchart 800 for supporting multiple connections;

FIG. 9 is a flowchart 900 for an interactive teaching session;

DETAILED DESCRIPTION OF THE PREFERRED EMBODIMENTS

Figure 1:
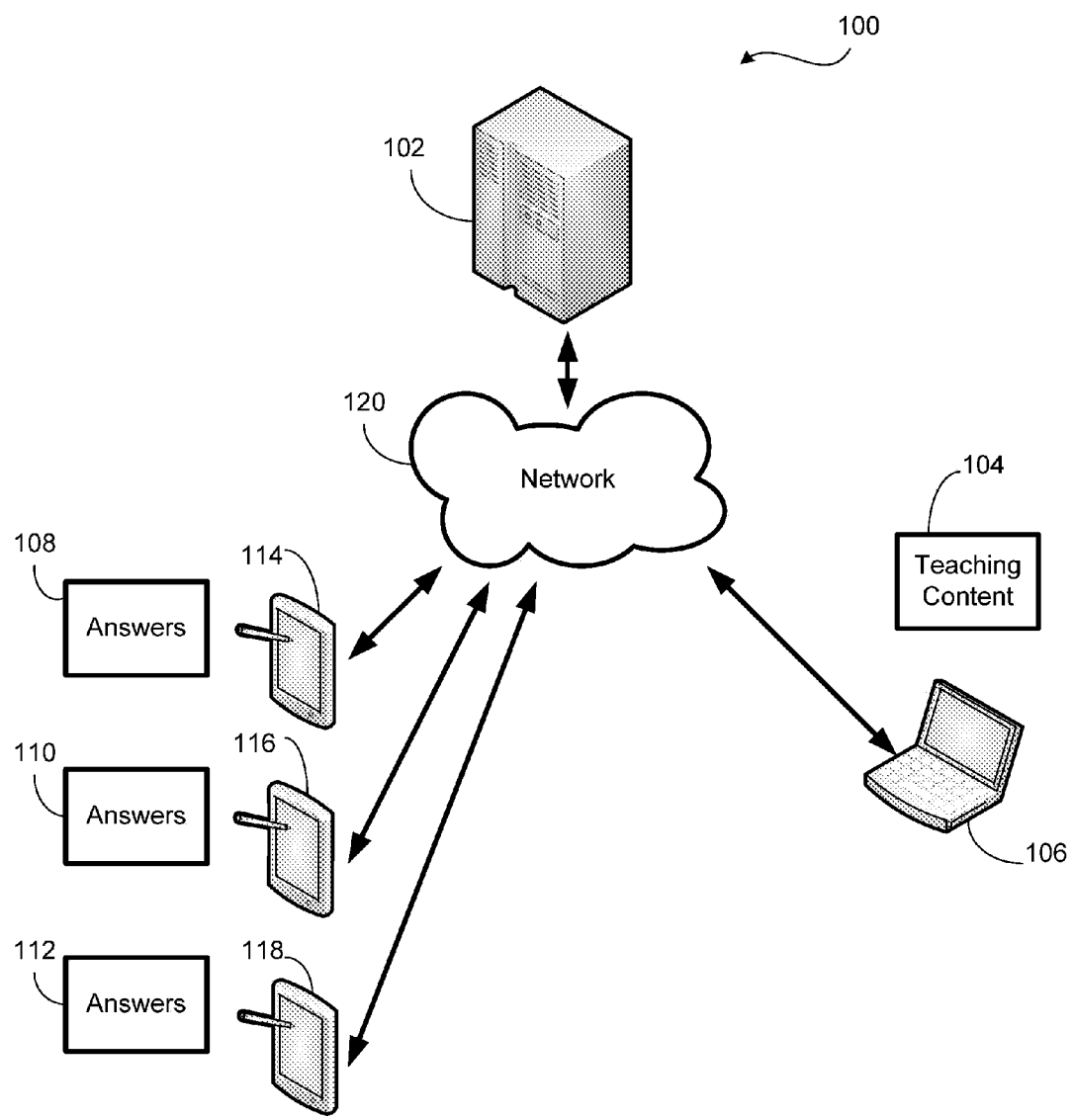
FIG. 1 depicts a traditional computer-based learning system 100.
Figure 2:
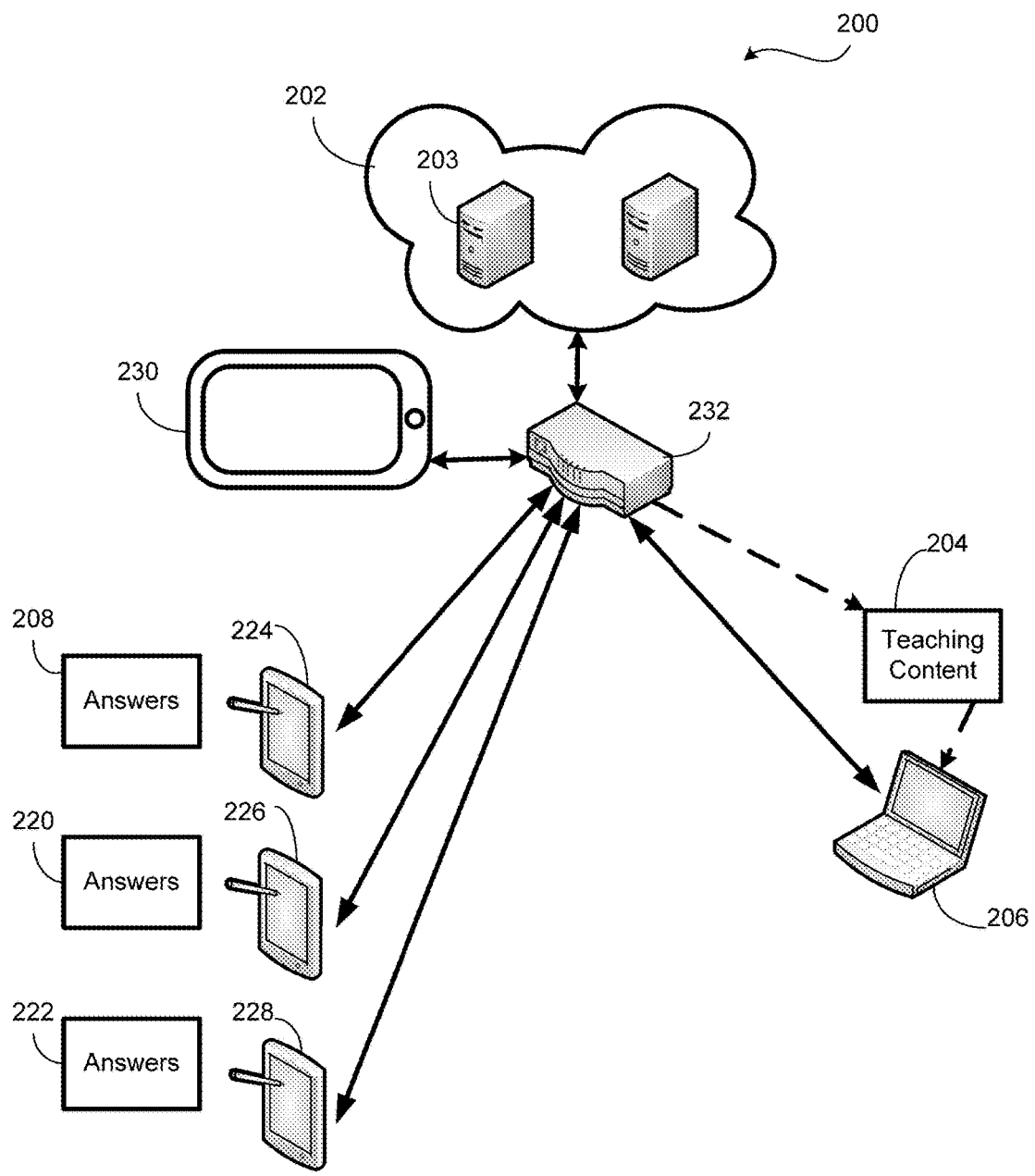
FIG. 2 illustrates architecture of a system 200 according to the present invention.

The technology described in this application enables provides a platform for computer-based interactive learning system that can function even when connections to a remote server is not stable or available. FIG. 2 illustrates architecture of a system 200 according to the present invention. The system 200 comprises an adaptive server 230 in communication, through the Internet 202, with one or more cloud servers 203. The adaptive server 230 is equipped with communications devices that enables the adaptive server 230 to communicate either wired or wirelessly through a router 232 of a local area network and also through cellular communication to a cellular telecommunication network. Though not shown in FIG. 2, the adaptive server 230 is further capable of serving as a WiFi station (aka hotspot mode) and communicating with multiple student devices through WiFi. In the hotspot mode, the adaptive server 230 functions as a router/gateway for the student devices and the teacher devices. Normally the adaptive server 230 is connected either through a cable or wirelessly to a router 232 connected to a local area network (LAN) and continuously updates the teaching material that is being used.

In one embodiment, the adaptive server 230 communicates with one or more student devices 224, 226, 228, and also with a teacher device 206 when the student devices 224, 226, 228, and the teacher device 206 are on the same LAN. The adaptive server 230 enables the teacher device 206 to upload the teaching material 204 to the cloud servers 203. The student devices and the teacher device 206 can be portable telephones, tablet computers, laptop computers, regular desktop computers, or other suitable mobile devices. The adaptive server 230 also transmits the teaching material 204 to the student devices 224, 226, 228 and receives the student answers 208, 220, 222 from the student devices and sends them to the teacher device 206. The adaptive server 230 maintains the connection to the cloud servers 203 and continuously downloads the teaching material 204 from the cloud servers 203 and stores in a memory in the adaptive server 230. The adaptive server 203 also uploads the student's input and answers to the cloud server 203.

In another embodiment, the student devices 224, 226, 228, and the teacher device 206 communicate directly with the cloud servers 203 and the adaptive server 230 is in the standby condition. The adaptive server 230 will communicate with the cellular telecommunication network if the adaptive server 230 detects that the LAN is not available.

Figure 3:
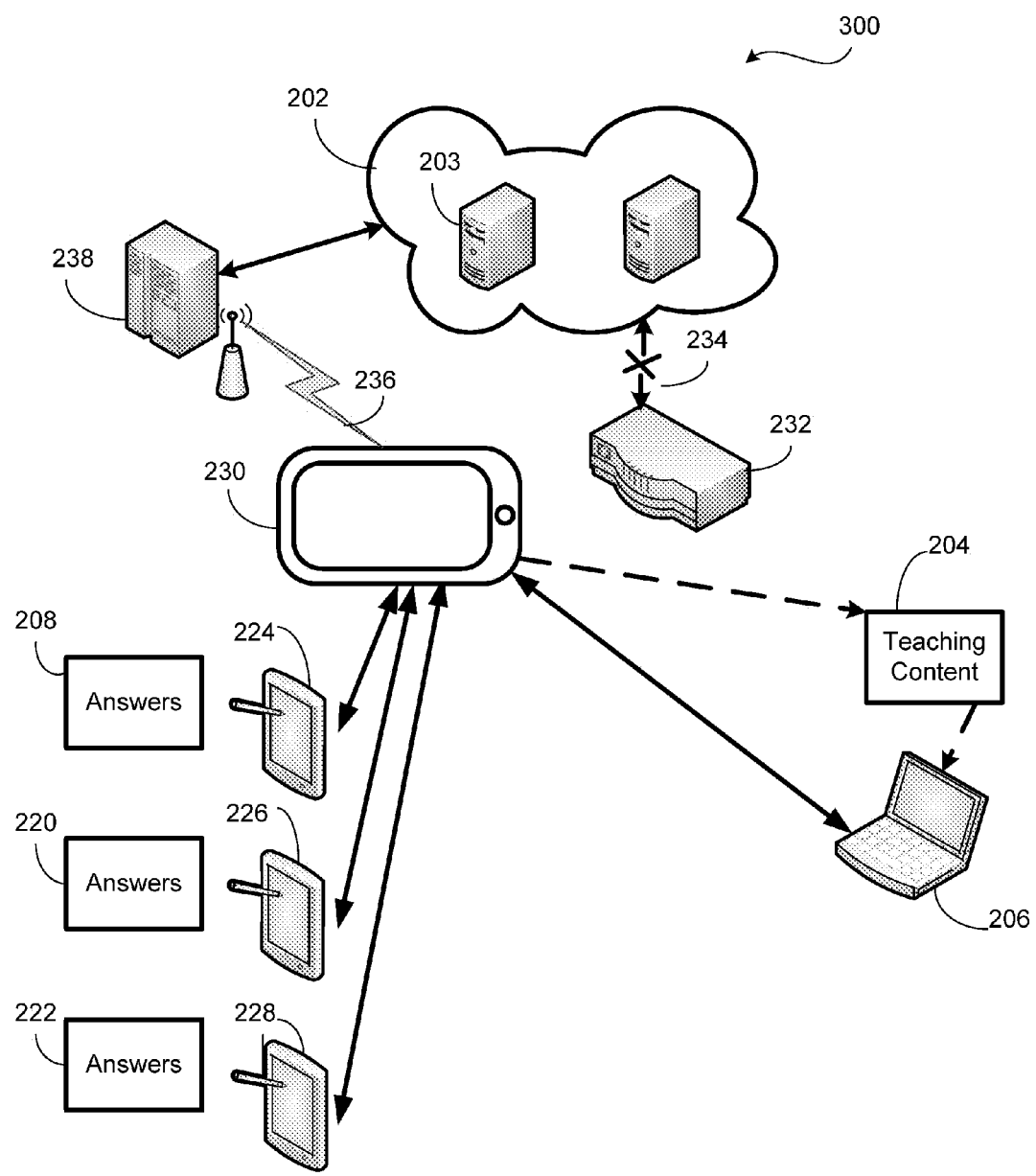
FIG. 3 illustrates the system 300 of the present invention that supports an uninterrupted learning setting when the LAN is not available or stable.

The setting shown in FIG. 2 usually works well in locations where the LAN is available and stable. However, the connection to the LAN may be unstable in some locations. FIG. 3 illustrates the system 300 of the present invention that supports an uninterrupted learning setting when the LAN is not available or stable. When the connection 234 from the router 232 to the Internet 202 is not available, the adaptive server 230 will set up a connection 236 to the cellular telecommunication network 238 of a telecommunication service provider and then communicate with the cloud servers 203 through the Internet 202. After the connection to the cloud servers 203 is set up, the adaptive server 230 turns on the WiFi capability and serves as a hotspot to the student devices 224, 226, 228 and the teacher device 206. A notification is sent to the student devices 224, 226, 228 and the teacher device 206 and these devices can then switch their connections to connect to the adaptive server 230. The switching of connection from the adaptive server 230 to the cloud servers 203 through the cellular telecommunication network 238 may be initiated automatically by the adaptive serve 230 upon detecting the LAN being unavailable or unstable and may also be initiated through a command received from the teacher device 206 or by manually entering a command at the adaptive server 230.

Figure 4:
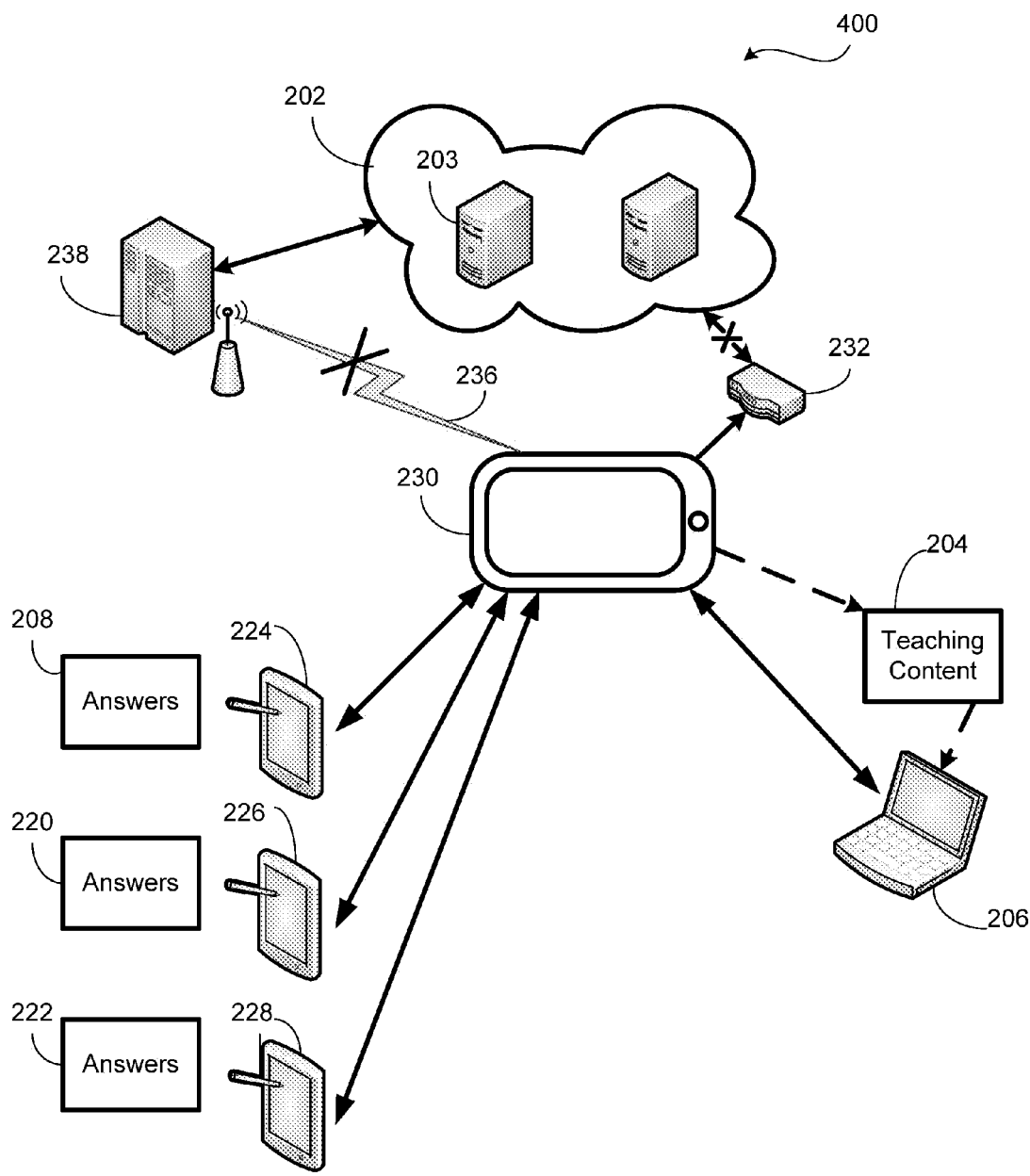
FIG. 4 illustrates a scenario 400 when there is no connection to a local area network and the connection 236 to the telecommunication network 238 is not available or unstable.

The present invention is particularly useful in areas where there is no connection to a LAN and the connection to the telecommunication network is unstable or unavailable. FIG. 4 illustrates a scenario 400 when there is no connection to a local area network and the connection 236 to the telecommunication network 238 is not available or unstable. If this scenario 400 happens during a teaching session and the teacher elects to continue the teaching session in the offline mode, the adaptive device 230 will support the teaching session in the offline mode by broadcasting the teaching material stored in the local memory and also receiving inputs and answers from the student devices. The received inputs and answers are stored in the local memory of the adaptive server 230 and transmitted to the cloud servers 203 when either the connection 236 is available or the connection via the router 232 is available.

As described above, the adaptive server 230 enables a teacher to conduct a teaching uninterruptedly when the connection to the LAN or to the cellular network is unavailable. The adaptive server 230 accomplishes this uninterrupted feature by acting as a platform and allows the communication between the teacher device and the student devices and also by storing in the local storage the teaching material downloaded from a cloud server.

Though the adaptive server 230 and the teacher device 206 are described above as two separate devices, in one alternative embodiment, the adaptive server 230 and the teacher device 206 can be one single device.

Figure 5:
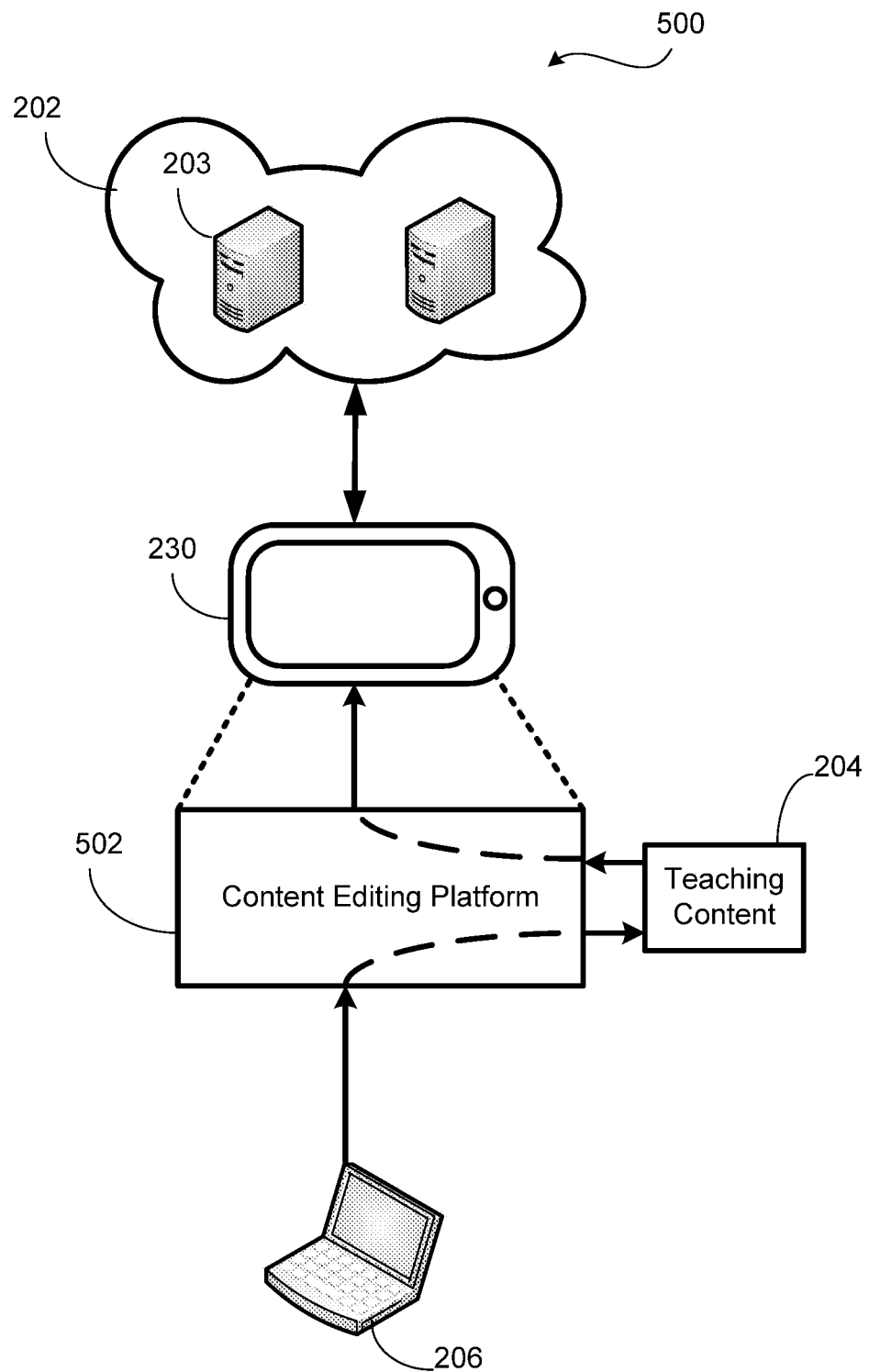
FIG. 5 depicts the adaptive server 230 offering a teaching material development platform.
Figure 6:
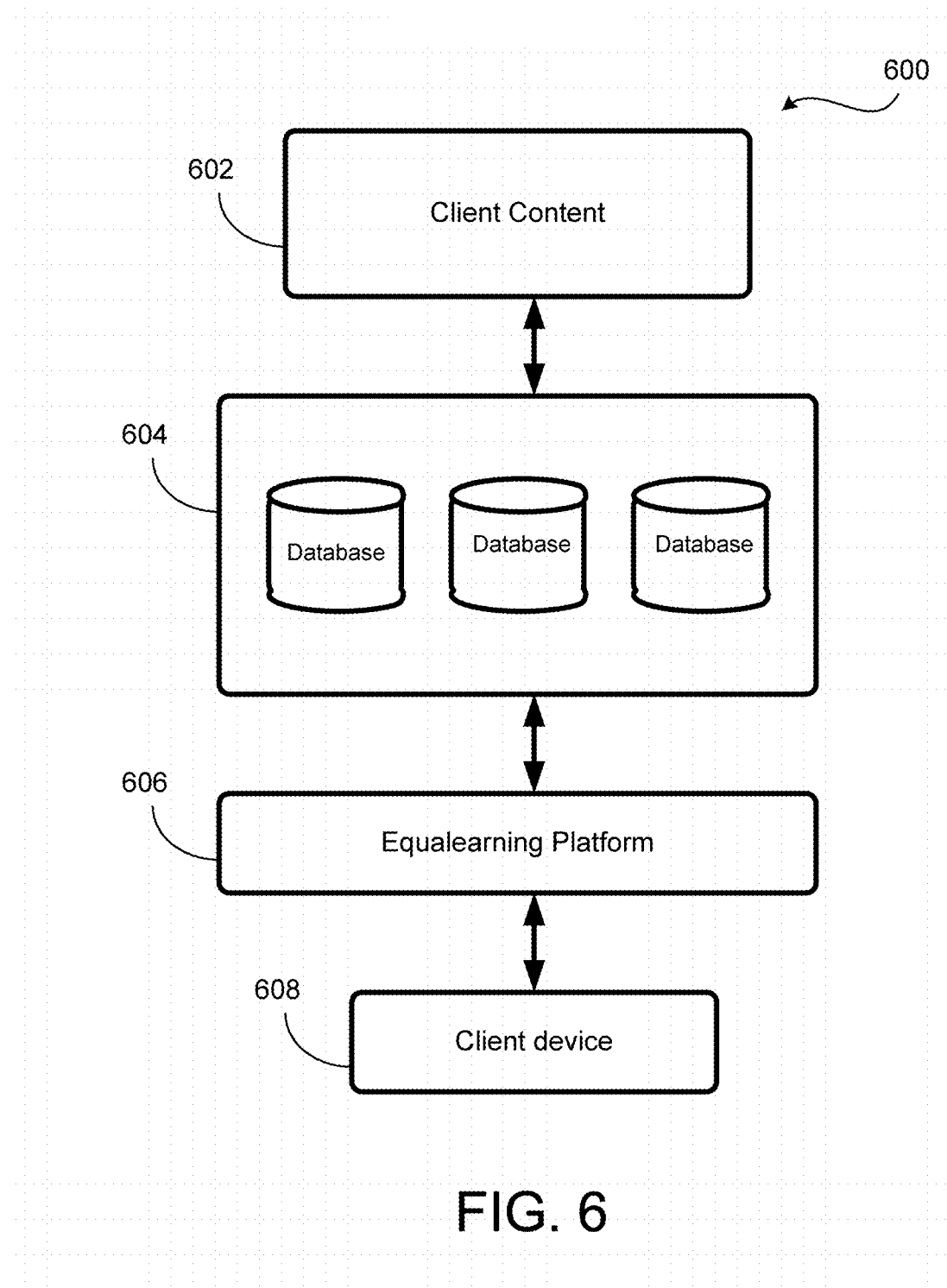
FIG. 6 illustrates a scenario 600 in which the adaptive server 230 is used for a client device 608 to develop any client content 602.

FIG. 5 depicts the adaptive server 230 offering a content editing platform 502 that enables the teacher to develop the teaching material 204. The teaching material 204 can be saved to the cloud servers 203. The adaptive server 230 can also be used for applications other than teaching and learning. FIG. 6 illustrates a scenario 600 in which the adaptive server 230 is used for a client device 608 to develop any client content 602. The platform 606 in the adaptive server 230 enables the client device to develop specific application using resources stored in database 604. The database 604 may be local to the adaptive server 230 or located in the cloud. The developed client content 602 can be later downloaded by other user devices.

Figure 7:
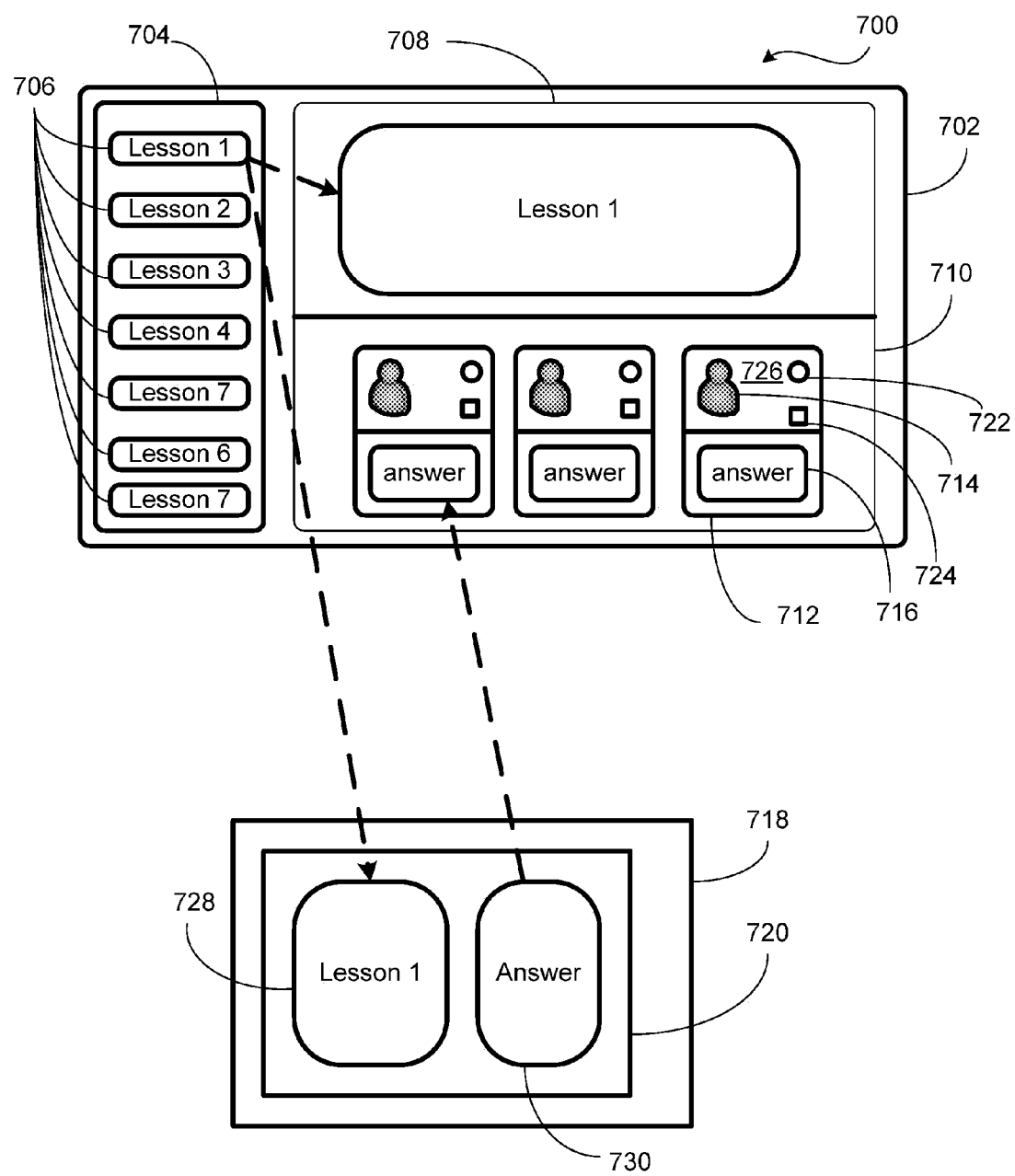
FIG. 7 is an illustration 700 of a teacher device 702 interfaced with one or more student devices 718.

Besides supporting an uninterrupted learning platform, the system of the present invention is specially designed to support an interactive learning environment. FIG. 7 is an illustration 700 of a teacher device 702 interfaced with one or more student devices 718. After logging in, the teacher will see a screen 704 with a list of lessons 706 that are available from the cloud servers 203. The teacher will also see an area 710 that includes several student display areas 712, one student display area 712 for each student. Each student display area 712 has a student information area 726 and a student answer area 716. Each student display area 712 is connected to a connection port in the teacher device 702 and this connection port provides a virtual direct connection to a student device 718. The student information area 726 may display one or more indicators of the status of the student. The information area 726 will also show the photo 714 of the student. The teacher may select a lesson 706 for a particular teaching session and the content of this lesson 708 will be downloaded from the cloud server 203 onto the memory of the teacher device 702. The same content will also be broadcasted to the student devices 718 that are "present" at the teaching session.

The student device 718 has a display screen 720 that has a lesson area 728 and an answer area 730. The lesson will be displayed on the lesson area 728, and the student can interact with the teacher during the teaching session by entering questions or answers in the answer area 730. The information entered by the student in the answer area 730 will be displayed on the student answer area 716.

The adaptive server 230 according to the present invention being able to support uninterrupted learning session is due to the capability of the adaptive server 230 to communicate with a local area network and a cellular network, and the capability to act as a WiFi Base station and to accept connections from the student devices. FIG. 8 is a flowchart 800 for supporting multiple connections. The adaptive server 230 checks whether it is connected to a local area network (LAN), step 802. If the adaptive server 230 is not connected to the LAN, the adaptive server 230 will connect to a cellular telecommunication network, step 804, and communicate to a remote server through the data channel in the cellular telecommunication network. After connecting to the cellular telecommunication network, the adaptive server 230 turns on a WiFi transmitter, step 806, so the adaptive serve 230 may act as a WiFi base station and communicate via WiFi with the student devices. The adaptive server 230 will connect to the remote server, step 808, and accept connections from the student devices and teacher devices, step 810. The adaptive server 230 can be connected to the LAN and then communicate with the remote server, step 808, and accept the connections from the student devices and the teacher devices, step 810.

After being in communication with the remote server, the student devices, and the teacher device, the adaptive server 230 can support an interactive teaching session. FIG. 9 is a flowchart 900 for an interactive teaching session. After the students and the teacher log into their respective devices, step 902, the adaptive server 230 checks if the teaching material is downloaded from the remote server, step 904. If the teaching material has not been downloaded yet, the adaptive server 230 will download the teaching material from the remote server, step 906, and then broadcast the teaching material to the student devices and the teacher device, step 908. The students may send questions or provide answers during the teaching session and the inputs from the student devices are sent to the adaptive server 230, step 910, and the adaptive server 230 will forward the student inputs to the teacher device, step 912. The teacher can also use his/hers teacher device to send messages or additional material to all the student devices. The input from the teacher device is received by the adaptive server 230, step 914, which will forward the input to all the student devices or a particular student device, step 916. By being able to specify which student device should receive the input, the teacher may provide a second chance to a particular student during a quiz if the student has provided a wrong answer initially.

Figure 10:
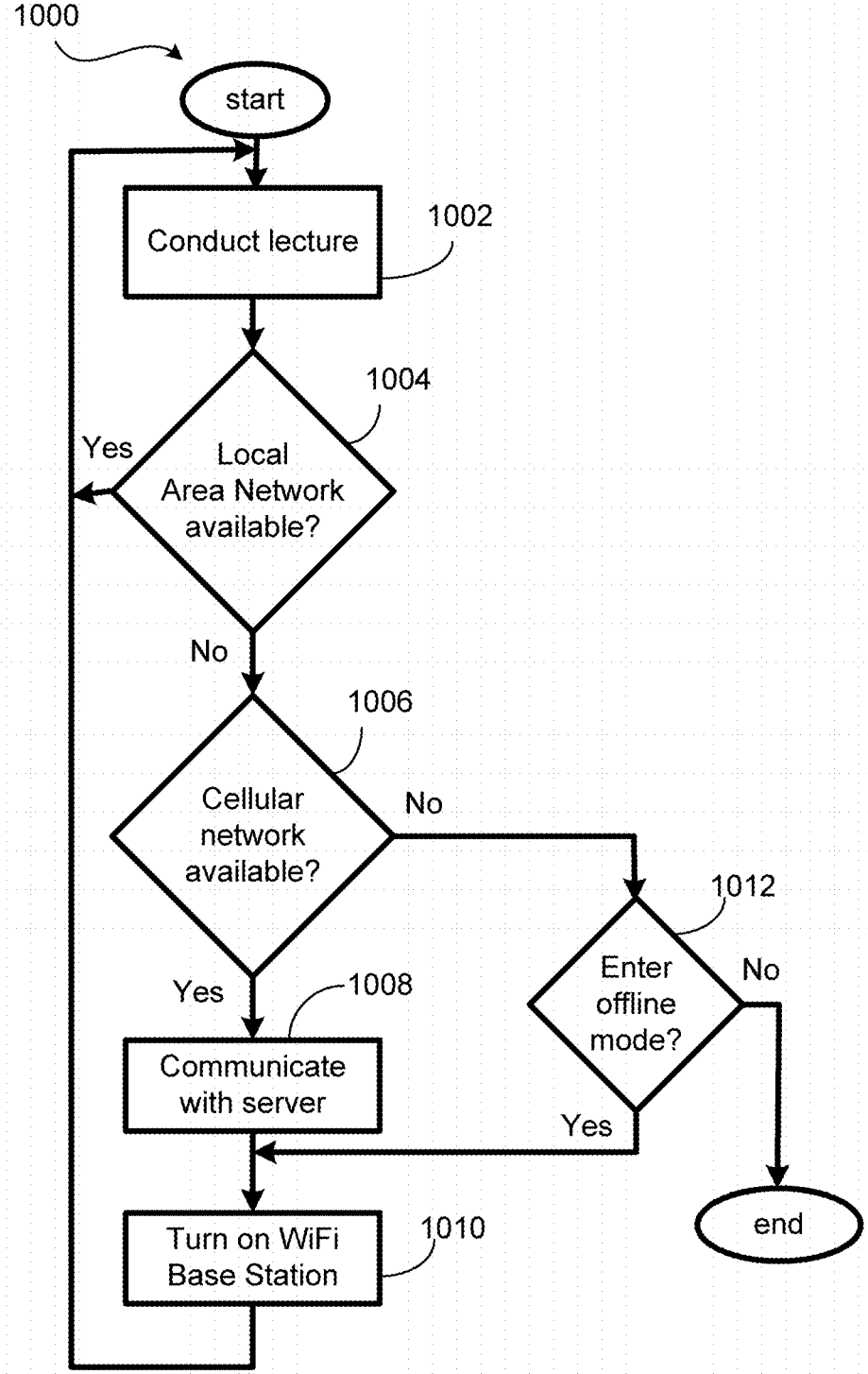
FIG. 10 is a process 1000 for supporting uninterrupted learning.

Besides the interactive teaching session, the adaptive server 230 can support uninterrupted learning in which the teaching session is not interrupted because of network unavailability or instability. FIG. 10 is a process 1000 for supporting uninterrupted learning. While the adaptive server 230 conducting a lecture, step 1002, the adaptive server 230 continuously checks the availability of the LAN, step 1004. If the LAN is not available, the adaptive server 230 checks whether the cellular network is available, step 1006. If the cellular network is available, the adaptive server 230 starts to communicate with the remote server, step 1008, and turns on the WiFi circuitry to act as a WiFi base station, step 1010, and starts to accept WiFi connection requests from the student devices and the teach device. If the cellular network is not available, the adaptive server 230 checks if the teacher has elected to enter into the offline mode, step 1012. If the teacher elected to enter the offline mode, the adaptive server 230 turns on the Wifi base station capabilities and starting to communicate with the student devices and the teach device.

The teaching session can continue with the teaching material previously downloaded from the remote server. The adaptive server 230 continuously monitors the status of the LAN and the cellular network, when connection to the remote server through either one of these networks is available, the adaptive server 230 downloads additional teaching material from the remote server and uploads inputs from the student devices and the teaching device to the remote server for storage. The scenario described above illustrates that the instability of network connections will not interrupt the teaching session using the system of the present invention.

Figure 11:
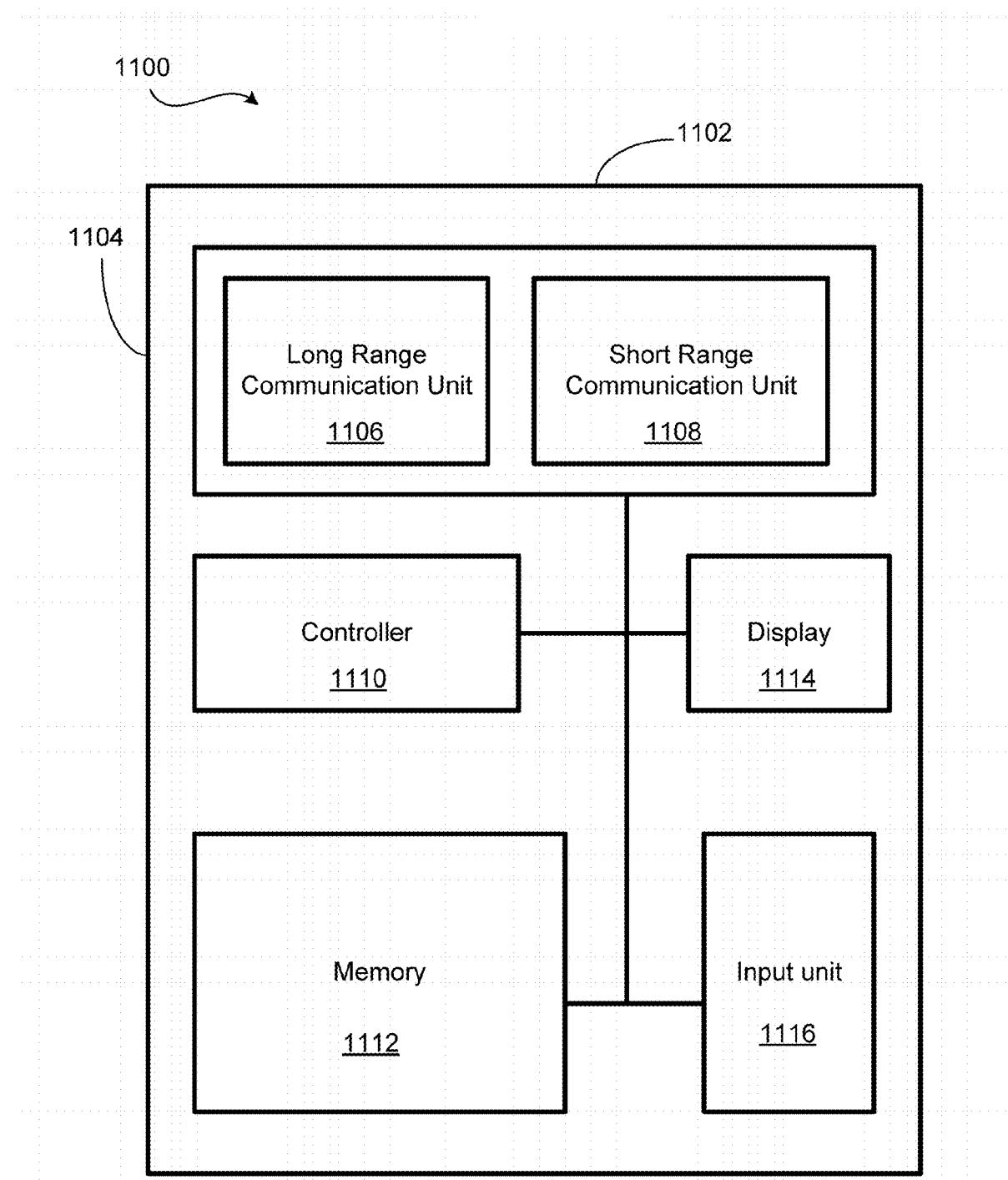
FIG. 11 illustrates an exemplary architecture 1100 for the adaptive server 1102 of the present invention.

Though the adaptive server 230 and the teacher device are described as separately devices, in an alternative embodiment, the teacher device may incorporate the features of the adaptive server and in effect, making the teacher device and the adaptive server one single device. FIG. 11 illustrates an exemplary architecture 1100 for the adaptive server 1102 of the present invention. The adaptive server 1102 has a communication unit that includes a circuitry for long range communication 1106 and a circuitry for short or medium range communication 1108. The long range communication circuitry 1106 is capable of communicating with a cellular telecommunication network and the short or medium range communication device 1108 is capable of communicating through of one or more short or medium range communication protocols. Example protocols include Dedicated Short-Range Communications (DSRC), WI-FI®, BLUETOOTH®, infrared, infrared data association (IRDA), near field, communications (NFC), the like, or improvements thereof. The short range communication device 1108 also supports a wired connection to a local area network as well as becoming a hotspot provider (WiFi base). The adaptive server 1102 further includes a controller 1110, a display device 1114, a memory 1112, and an input device 1116. The display device 1114 displays teaching material or messages to the user. The input unit 1116 enables a user (a teacher) to enter messages or other input. The memory 1112 is a non-transitory memory and capable of storing the teaching material downloaded from the remote server and also the program instructions that support different features of the present invention. The controller 1110 controls the operation of the adaptive server and determines the status of connections to the cloud servers via different connections.

Although FIG. 11 illustrates components in the adaptive server 230 as separate hardware circuitries, it is understood that these components may be combined and also these components may be implemented by program instructions executed by the controller 1110.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims. It is understood that features shown in different figures and described in different embodiments can be easily combined within the scope of the invention.

Modifications, additions, or omissions may be made to the systems and methods described without departing from the scope of the disclosure. The components of the systems and methods described may be integrated or separated according to particular needs. Moreover, the operations of the systems and methods described may be performed by more, fewer, or other components without departing from the scope of the present disclosure.

Different terms have been used in this description and many of them have same interpretation. For example, cellular network, cellular telecommunication network, and telecommunication network are used interchangeably. WiFi connection and local area network connection are used interchangeably. Cloud server and remote server are used interchangeably. Teaching material and lecture are used interchangeably.

Although the present disclosure has been described with several embodiments, sundry changes, substitutions, variations, alterations, and modifications can be suggested to one skilled in the art, and it is intended that the disclosure encompass all such changes, substitutions, variations, alterations, and modifications falling within the spirit and scope of the appended claims.

What is claimed is:

1. A method, for providing an uninterrupted teaching session, comprising:
   determining, by a controller, a status of a connection to a remote server via a short range communication unit;
   connecting, by the controller, to the remote server via a long range communication unit if the connection to the remote server via the short range communication unit is unavailable;
   turning on, by the short range communication unit, a WiFi base station capability if both the connection to the remote server via the short range communication unit is unavailable and a connection to the remote server via the long range communication unit is unavailable;
   downloading teaching material from the remote server;
   storing the teaching material in a memory unit;
   receiving student input from at least one student device;
   transmitting the student input to a teacher device;
   receiving data from the teacher device;
   transmitting the data to the at least one student device;
   transmitting, via the WiFi base station capability, the teaching material to the at least one student device;
   communicating, via the WiFi base station capability, with the at least one student device.

2. The method of claim 1, wherein the teaching material is downloaded by the long range communication unit.

3. The method of claim 2, wherein the teaching material is downloaded by the short range communication unit.

4. The method of claim 1, further comprising receiving a command from a teacher device before turning on the WiFi base station capability.

5. The method of claim 1, further comprising receiving connection requests from the at least one student device.

6. The method of claim 1, further comprising transmitting the student input to the remote server if the connection to the remote server becomes available.

7. A non-transitory computer readable memory have a set of computer-executable instructions, which, when executed by a controller in a computer, cause the computer to:
   determine, by the controller, a status of a connection to a remote server via a short range communication unit in the computer;
   connect, by the controller, to the remote server via a long range communication unit in the computer if the connection to the remote server via the short range communication unit is unavailable;
   turn on, by the short range communication unit in the computer, a WiFi base station capability if both the connection to the remote server via the short range communication unit is unavailable and a connection to the remote server via the long range communication unit are unavailable;
   download teaching material from the remote server;
   store the teaching material in a memory unit;
   receive student input from at least one student device;
   transmit the student input to a teacher device;
   receive data from the teacher device;
   transmit the data to the at least one student device;
   transmit, via the WiFi base station capability, the teaching material to the at least one student device;
   communicate, via the WiFi base station capability, with the at least one student device.

8. The set of computer-executable instructions of claim 7 wherein the teaching material is downloaded by the long range communication unit.

9. The set of computer-executable instructions of claim 7, wherein the teaching material is downloaded by the short range communication unit.

10. The set of computer-executable instructions of claim 7, further cause the computer to receive a command from a teacher device before turning on the WiFi base station capability.

11. The set of computer-executable instructions of claim 7, further cause the computer to receive connection requests from the at least one student device.

12. The set of computer-executable instructions of claim 7, further cause the computer to transmit the student input to the remote server if the connection to the remote server becomes available.

* * * * *